United States Patent
Goto

(10) Patent No.: US 7,430,864 B2
(45) Date of Patent: Oct. 7, 2008

(54) MASTER CYLINDER AND METHOD OF MOUNTING STOPPER PLATE

(75) Inventor: Yuji Goto, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 281 days.

(21) Appl. No.: 11/471,619

(22) Filed: Jun. 21, 2006

(65) Prior Publication Data
US 2007/0006584 A1 Jan. 11, 2007

(30) Foreign Application Priority Data
Jul. 5, 2005 (JP) ............................. 2005-196339

(51) Int. Cl.
*B60T 11/20* (2006.01)
*B60T 11/28* (2006.01)
(52) U.S. Cl. ......................................... 60/562; 60/582
(58) Field of Classification Search .................. 60/562, 60/582
See application file for complete search history.

(56) References Cited

U.S. PATENT DOCUMENTS

| | | | | |
|---|---|---|---|---|
| 5,878,575 A | * | 3/1999 | Kreh et al. ..................... | 60/562 |
| 5,970,711 A | * | 10/1999 | Kaneko et al. ................. | 60/588 |
| 6,000,220 A | * | 12/1999 | Simon Bacardit ............ | 60/562 |
| 6,318,082 B1 | * | 11/2001 | Hirayama ..................... | 60/588 |
| 7,344,203 B2 | * | 3/2008 | Tsubouchi et al. ............ | 60/592 |

FOREIGN PATENT DOCUMENTS

| JP | 3035226 | 2/2000 |
|---|---|---|
| JP | 2004-291933 | 10/2004 |

\* cited by examiner

*Primary Examiner*—Igor Kershteyn
(74) *Attorney, Agent, or Firm*—Buchanan Ingersoll & Rooney PC

(57) ABSTRACT

A master cylinder includes primary and secondary pistons both slidably mounted in the cylinder bore of a cylinder. A stopper plate is disposed in the cylinder bore behind the secondary piston. A groove having a larger diameter than the piston sliding surfaces is formed in the inner wall of the cylinder bore at its axially intermediate portion. The stopper plate includes a pair of diametrically opposed flanges having an outer diameter larger than the diameter of the piston sliding surfaces and smaller than the diameter of the groove. The flanges are received in the groove and engageable with a shoulder formed at the rear end of the groove, thereby preventing excessive backward movement of the secondary piston. The stopper plate has a dimension perpendicular to the direction in which the flanges extend and smaller than the diameter of the piston sliding surfaces. Thus, the stopper plate can be inserted into the cylinder bore with one of the flanges located ahead of the other.

3 Claims, 4 Drawing Sheets

MASTER CYLINDER AND METHOD OF MOUNTING STOPPER PLATE

CROSS REFERENCE TO RELATED APPLICATIONS

This application is based on and claims priority under 35 U.S.C. sctn. 119 with respect to Japanese Patent Application No. 2005-196339 filed on Jul. 5, 2005, the entire content of which is incorporated herein by reference.

BACKGROUND OF THE INVENTION

The present invention relates to a master cylinder for a vehicle hydraulic brake system, and a method of mounting a stopper plate for preventing excessive backward movement of a secondary piston of the master cylinder.

Many of today's vehicle hydraulic brake systems have an automatic brake function such as traction control (TRC) or electronic stability control (ESC).

In a vehicle hydraulic brake system having an automatic brake function, during e.g. TRC, hydraulic fluid is supplied from a hydraulic pressure source including a power pump toward selected wheel cylinders. During such automatic brake control, hydraulic oil often returns suddenly and rapidly into pressure chambers in the master cylinder. Ordinary tandem master cylinders have a first pressure chamber in which brake hydraulic pressure is produced by a primary piston and a second pressure chamber in which brake hydraulic pressure is produced by a secondary piston. If the pressure in the first pressure chamber rises due to the returned hydraulic fluid, reaction force acts on and tends to push back the primary piston. If the pressure in the second pressure chamber rises due to the returned hydraulic fluid, reaction force acts on and tends to push back the secondary piston.

If the pistons are unduly pushed back as a result, they may come out of the cups. Once the pistons come out of the cups, they may damage the cups when returning to their inoperative positions. Thus, it is necessary to prevent excessive backward movement of the pistons. Excessive backward movement of the primary piston can be prevented by the input rod. But additional means are necessary to restrict backward movement of the secondary piston.

Such means are disclosed in JP patent publication 3035226B (Publication 1) and JP patent publication 2004-291933A (Publication 2). Means for restricting the backward movement of the secondary piston disclosed in Publication 1 includes a retainer fixed to a protrusion formed on the inner surface of the bottom wall of the cylinder, and a bolt member (known as a suspension bolt) coupled to the secondary piston and in engagement with the retainer to prevent excessive backward movement of the secondary piston. The retainer is fixed to the protrusion formed on the bottom wall of the cylinder by engaging claws formed on the retainer with the protrusion.

Publication 2 discloses a suspension structure for restricting the backward movement of the secondary piston which includes a shaft member mounted to a retainer for the primary piston, and a retainer supporting the end of the return spring for the primary piston near the secondary piston and in engagement with the shaft member. The suspension retainer includes an elastically deformable extension having a flange. A tapered portion at the rear end of the secondary piston is pressed against the extension to elastically and radially outwardly deform the extension with the radial component of the force applied to the tapered surface of the tapered portion. The flange thus radially expands and is brought into engagement with a shoulder formed on the cylinder body at the rear end of a peripheral groove having a larger diameter than piston sliding surfaces formed on the inner periphery of the cylinder body, thus restricting the backward movement of the secondary piston.

The arrangement of Publication 1 needs two members, i.e. the bolt member and the retainer engaging the bolt member. It is further necessary to form a threaded hole in the secondary piston in which the bolt member is threadedly engage. The cost of the parts and the machining cost are therefore high. It is difficult to insert the retainer into the cylinder bore from its open end. Thus, a cylinder bottom is formed separately from the cylinder body and threaded into the cylinder body. This increases the numbers of the machining steps and assembling steps.

In the arrangement of Publication 2, because the flange of the retainer is radially expanded until it engages the peripheral groove under the returning force of the secondary piston, the elastic restoring force of the extension of the retainer has to be smaller than the force of the return spring for the secondary piston. Thus, the thickness of the extension of the retainer is limited and so is the strength of the flange. This makes it difficult to reliably restrict the backward movement of the flange.

SUMMARY OF THE INVENTION

An object of the present invention is to provide an arrangement for restricting the backward movement of the secondary piston of a tandem master cylinder when hydraulic fluid is rapidly returned into the second pressure chamber during e.g. traction control which comprises a small number of parts and can be assembled with a small number of steps.

According to the present invention, there is provided a master cylinder (tandem master cylinder) comprising a cylinder body having an inner wall defining a cylinder bore, a primary piston and a secondary piston both slidably mounted in the cylinder bore, and a stopper plate disposed in the cylinder bore behind the secondary piston, the inner wall having sliding surfaces along which the primary and secondary pistons slide respectively, the sliding surfaces having a first diameter, the inner wall further having a groove formed at a longitudinally intermediate portion of the inner wall, the groove having a second diameter larger than the first diameter, the stopper plate having a pair of diametrically opposed flanges having outer edges defining a circle having a third diameter larger than the first diameter and smaller than the second diameter, the flanges being received in the groove so as to be engageable with the secondary piston and a shoulder formed on the inner wall at a rear end of the groove, the stopper plate having a dimension perpendicular to the direction in which the flanges extend and smaller than the first diameter.

Thus, the arrangement for restricting the backward movement of the secondary piston according to the present invention comprises the groove and only one additional component (stopper plate), so that it can be assembled easily with a smaller number of steps and at a low cost.

Preferably, the stopper plate further includes a plurality of claws that are in engagement with an inner peripheral surface of the secondary piston at a rear end thereof.

From another aspect of the present invention, there is provided a method of mounting the stopper plate of claim 1 comprising inserting a tubular jig into the cylinder bore of the master cylinder of claim 1, the jig having such a length that its front end reaches the groove with its rear end located at an open end of the cylinder bore, inserting the stopper plate through the tubular jig from its rear end with one of the flanges of the stopper plate located ahead of the other of the flanges until the stopper plate clears the jig, and erecting the stopper plate to allow the flanges of the stopper plate to be received in the groove.

With this arrangement, since the stopper plate can be inserted into the cylinder bore with one of the flanges of the stopper plate located ahead of the other, it is not necessary to radially expand the flanges to bring the flanges into engagement with the shoulder. This makes it possible to increase the thickness of the stopper plate to ensure sufficient strength of the stopper plate so that it can withstand the force applied thereto from the secondary piston when the secondary piston moves backward under high pressure. Thus, the stopper plate according to the invention can reliably restrict the backward movement of the secondary piston.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
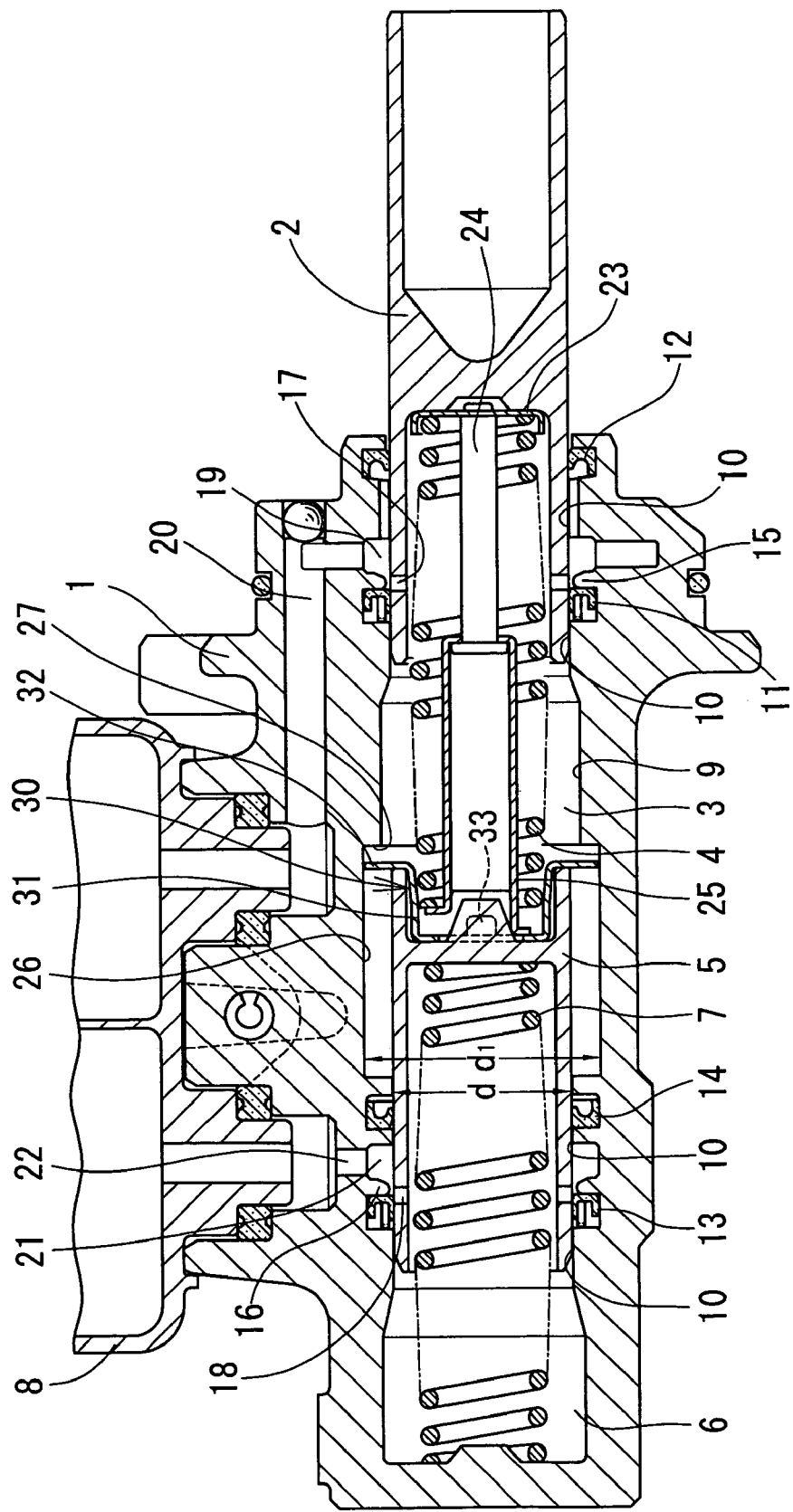
FIG. 1 is a sectional view of a master cylinder according to the embodiment of the present invention.

The master cylinder embodying the present invention is now described with reference to FIGS. 1 to 4. As shown in FIG. 1, the master cylinder comprises a cylinder body 1, a primary piston 2 received in the cylinder body 1, a return spring 4 for the primary piston 2, a secondary piston 5 mounted in the cylinder body 1 forwardly (leftwardly in FIG. 1) of the primary piston 2, a return spring 7 for the secondary piston 5, and a reservoir 8. The primary piston 2 and the secondary piston 5 define a first pressure chamber 3 therebetween in which brake hydraulic pressure is produced by pressurizing the hydraulic pressure therein with the primary piston 2. Between the secondary piston 5 and the end wall of the cylinder body 1, a second pressure chamber 6 is defined in which brake hydraulic pressure is produced by pressurizing the hydraulic fluid therein with the secondary piston 5. The primary piston 2 and the secondary piston 5 are slidable along sliding surfaces 10 of a cylinder bore 9. The first pressure chamber 3 and the second pressure chamber 6 each include an outlet port (not shown) through which hydraulic pressure produced in the respective pressure chamber is discharged.

The master cylinder further includes primary cups 11 and 13, a secondary cup 12 and a pressure cup 14 which are fitted in respective grooves formed in the inner periphery of the cylinder body 1 and held by the cylinder body 1. The primary cup 11 seals the outer periphery of the primary piston 2. The secondary cup 12 is pressed against the outer periphery of the primary piston 2, thereby hermetically isolating the interior of the cylinder body 1 from the atmosphere. The primary cup 13 seals the outer periphery of the secondary piston 5. The pressure cup 14 is pressed against the outer periphery of the secondary piston 5, thereby hermetically isolating the first pressure chamber 3 from the interior of the reservoir 8.

In the rear (rightwardly in FIG. 1) of the respective primary cups 11 and 13, annular walls 15 and 16 are formed which are integral with the cylinder body 1 to support the backs of the primary cups 11 and 13, respectively.

The annular walls 15 and 16 have an inner diameter larger than the outer diameter of the pistons 2 and 5 to define gaps therebetween. When the primary piston 2 and the secondary piston 5 are in their respective inoperative positions (positions shown in FIG. 1), the first pressure chamber 3 and the second pressure chamber 6 both communicate with the reservoir 8. In the example shown, the first pressure chamber 3 and the second pressure chamber 6 communicate with the reservoir 8 through a plurality of piston ports 17 and 18 formed in the primary piston 2 and the secondary piston 5, respectively, the gaps between the annular walls 15 and 16 and the respective pistons, and fluid passages 19 to 22 formed in the cylinder body 1.

The return spring 4 for the primary piston 2 has one end thereof supported by a support retainer 23 and the other end supported by a suspension retainer 25 which is configured to engage a suspension pin 24 fixed to the support retainer 23 when the return spring 4 expands by a predetermined length, thereby preventing further expansion of the return spring 4. This spring assembly makes it possible to use, as the return spring 4, a spring having a greater spring force than the return spring 7.

Now description is made of the characterizing feature of the present invention. A groove 26 is formed in the inner periphery of the cylinder body 11 at a longitudinally intermediate portion of the cylinder bore 9. The groove 26 has a diameter larger than the diameter d of the piston sliding surfaces 10. The groove 26 has preferably a circular cross-section because such a groove can be easily formed. But it may have a different cross-section, provided flanges 32 of a stopper plate 30 to be described later can be inserted therein. At the rear end (right-hand end in FIG. 1) of the groove 26, a shoulder 27 is formed. The stopper plate 30 is fitted on the rear end of the secondary piston 5. The stopper plate 30 cooperates with the shoulder 27 to keep the secondary piston 5 from moving backward beyond a predetermined point.

Figure 2A:
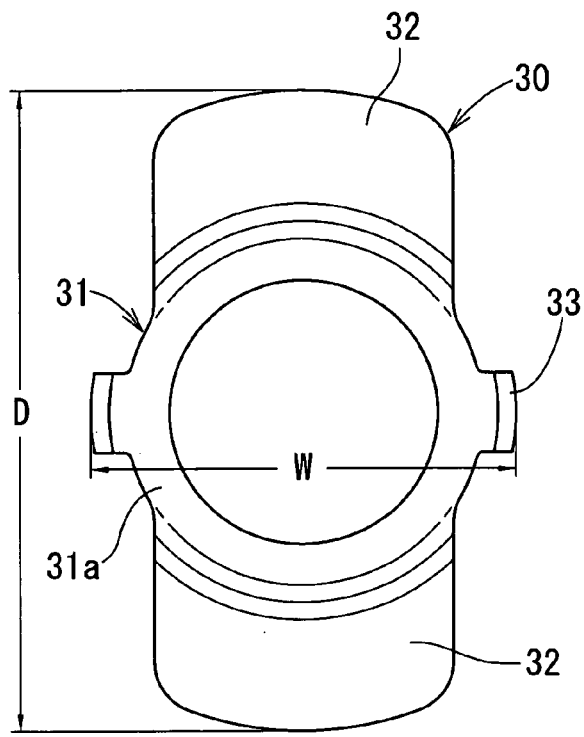
FIGS. 2A, 2B and 2C are a back view, a side view and a perspective view, respectively, of a stopper plate used in the master cylinder of FIG. 1.
Figure 2B:
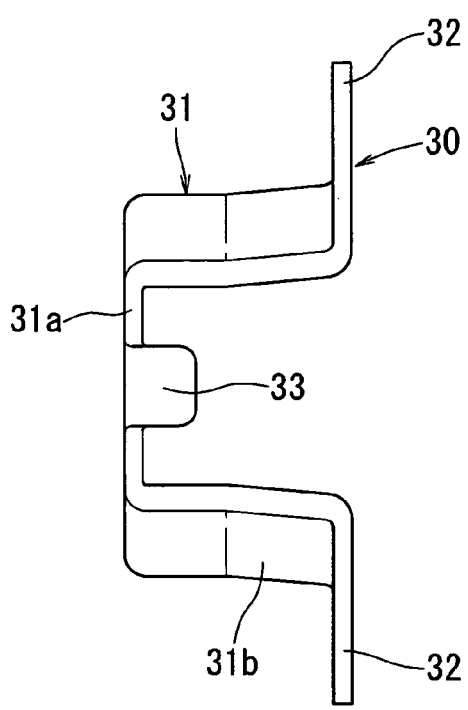
Figure 2C:
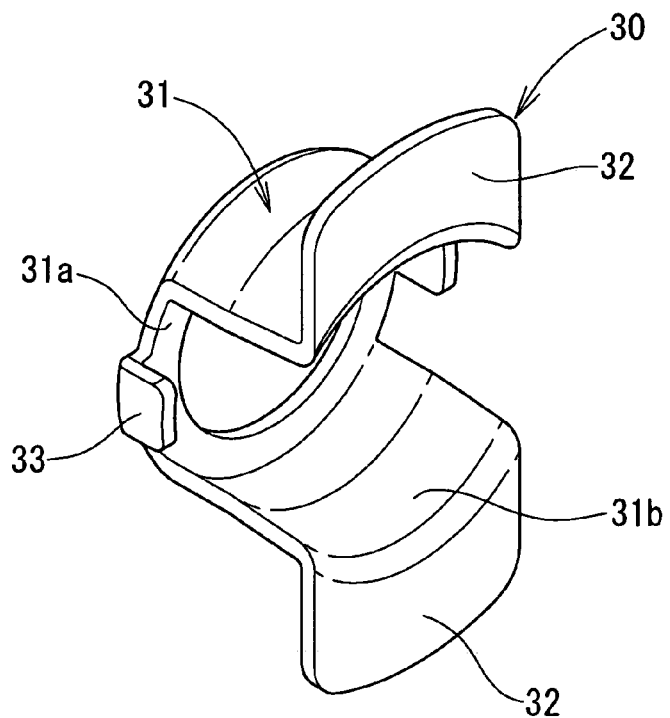

As shown in FIGS. 2A to 2C, the stopper plate 30 includes a trunk 31 comprising an end plate 31a and a diametrically opposed pair of extensions 31b extending rearwardly from the outer edge of the end plate 31a and having an arcuate cross-section. A pair of radially outwardly extending flanges 32 are formed at the rear ends of the respective extensions 31b so as to be symmetrical with respect to the center of the stopper plate 30. A pair of claws 33 are formed on the outer edge of the end plate 31a so as to be symmetrical with respect to the center of the stopper plate 30. The radially outer surfaces of the extensions 31b define a circle having such a diameter that the extensions 31b snugly fit in the recess formed in the rear end of the secondary piston 5.

The radially outer edges of the flanges 32 define a circle having a diameter D that is larger than the diameter d of the piston sliding surfaces 10 and smaller than the diameter $d_1$ of the groove 26. The dimension W of the stopper plate 30 perpendicular to the axis of the stopper plate 30 and perpendicular to the flanges 32 is smaller than the diameter d of the piston sliding surfaces 10 so that the stopper plate 30 can be inserted into the cylinder bore 9 with one of the flanges 32 positioned forwardly of the other flange as shown in FIG. 3.

The claws 33 are formed on the outer edge of the end plate 31a at positions angularly displaced from the extensions 31b by 90 degrees so as to extend rearwardly from the outer edge of the end plate 31a.

The stopper plate 30 is preferably formed by pressing a metallic plate because such a plate is easy to form and has sufficient strength. But it may be made of a resin if such a resin plate has sufficient strength.

Figure 3:
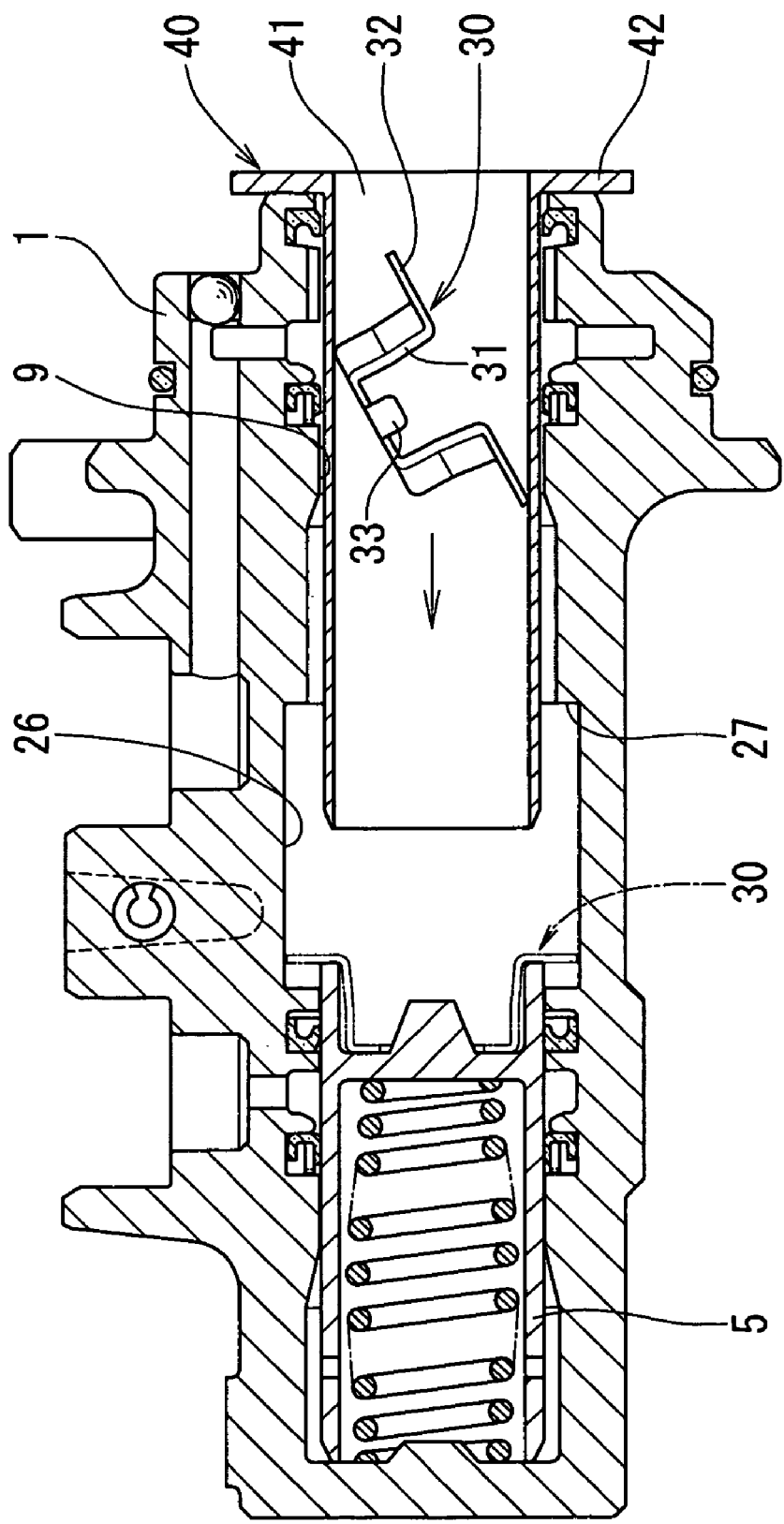
FIG. 3 is a sectional view of the master cylinder of FIG. 1 showing how the stopper plate is mounted.

FIG. 3 shows a method of mounting the stopper plate 30 according to the present embodiment. In this method, with a tubular mounting jig 40 inserted in a cylinder bore 9, the stopper plate 30 is inserted through the jig 40. The jig 40 is preferably a cylindrical member because the cylinder bore 9 is cylindrical. The jig 40 has such a length that its front end reaches the groove 26 with its rear end 41 at the open end of the cylinder bore 9. Preferably, a flange 42 is formed on the outer periphery of the jig 40 at its rear end 41 so that its front end is easily positionable by inserting the jig 40 into the cylinder bore 9 until the flange 42 abuts the cylinder body 1. In this state, the stopper plate 30 is gripped by a gripper (not shown) and inserted into the jig 40 from its rear end 41 with one of its flanges 32 located ahead of the other. When the stopper plate 30 clears the jig 40, the stopper plate 30 is erected and pushed into the recess formed in the rear end of the secondary piston 5, which has been inserted in the cylinder bore 9 before the stopper plate 30. The spring assembly including the return spring 4 and the primary piston 2 are then inserted into the cylinder bore 9 to assemble the master cylinder.

By using the jig 40, when inserted into the cylinder bore 9, the stopper plate 30 is kept out of contact with the inner wall of the cylinder bore 9 or any of the cups, which have been mounted before the stopper plate 30, thus preventing damage to the inner wall of the cylinder bore 9 and the cups. Also, when inserted into the cylinder bore 9, the stopper plate 30 will not be caught by any protrusion or recess, so that the stopper plate 30 can be smoothly inserted into the cylinder bore 9 and mounted in position.

Figure 4:
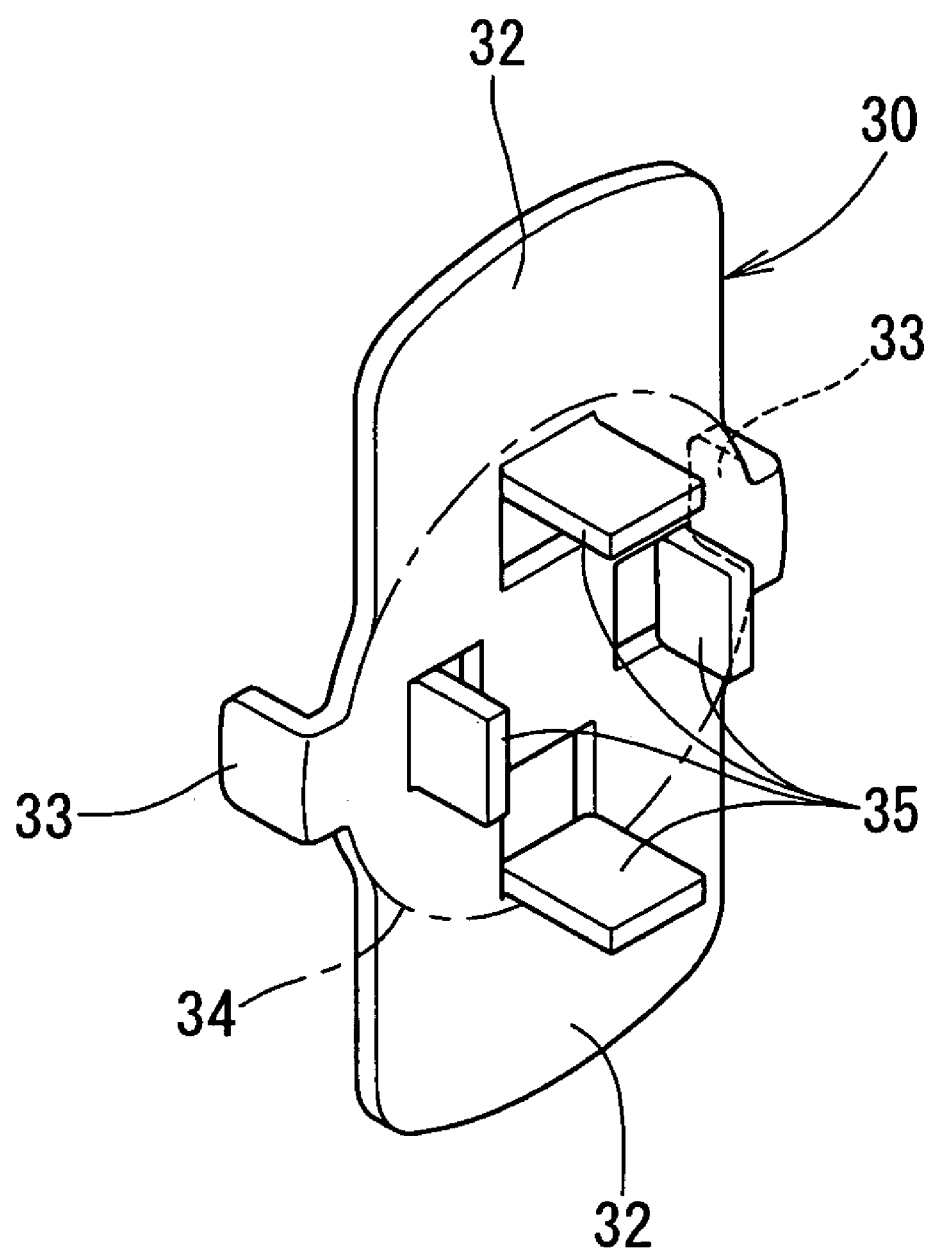
FIG. 4 is a perspective view of a different stopper plate which can be used in the master cylinder according to another embodiment of the present invention.

FIG. 4 shows a modified stopper plate 30 according to the present invention. This modified stopper plate 30 comprises a disk 34, a pair of diametrically opposed flanges 32 and a pair of diametrically opposed first claws 33, which are provided on the outer edge of the disk 34, and second claws 35 formed by cutting the disk 34 and bending the cut portions in a direction opposite to the direction in which the first claws 33 are bent. The stopper plate 30 of FIG. 4 is fitted in the secondary piston 5 by bringing the first claws 33 into engagement with the inner peripheral surface of the secondary piston 5 at its rear end. The return spring (or its spring assembly) for the primary piston has one end thereof fitted in the space defined by the second claws 35.

As with the stopper plate of FIG. 2, the circle defined by the outer edges of the flanges 32 has a diameter larger than the diameter of the sliding surfaces 10 of the cylinder bore 9 and smaller than the diameter of the groove 26, and the dimension of the stopper plate in the direction perpendicular to the direction in which the flanges 32 extend is smaller than the sliding surfaces 10 of the cylinder bore 9 so that the stopper plate 30 can be inserted into the cylinder bore 9 with one of the flanges 32 located ahead of the other. This stopper plate is used instead of the stopper plate of FIG. 2 according to the available space for the return spring for the primary piston.

What is claimed is:

1. A master cylinder comprising a cylinder body having an inner wall defining a cylinder bore, a primary piston and a secondary piston both slidably mounted in said cylinder bore, and a stopper plate disposed in said cylinder bore behind said secondary piston, said inner wall having sliding surfaces along which said primary and secondary pistons slide respectively, said sliding surfaces having a first diameter, said inner wall further having a groove formed at a longitudinally intermediate portion of said inner wall, said groove having a second diameter larger than said first diameter, said stopper plate having a pair of diametrically opposed flanges having outer edges defining a circle having a third diameter larger than said first diameter and smaller than said second diameter, said flanges being received in said groove so as to be engageable with said secondary piston and a shoulder formed on said inner wall at a rear end of said groove, said stopper plate having a dimension perpendicular to the direction in which said flanges extend and smaller than said first diameter.

2. The master cylinder of claim 1 wherein said stopper plate further includes a plurality of claws that are in engagement with an inner peripheral surface of said secondary piston at a rear end thereof.

3. A method of mounting the stopper plate of claim 1 comprising inserting a tubular jig into the cylinder bore of the master cylinder of claim 1, said jig having such a length that its front end reaches the groove with its rear end located at an open end of the cylinder bore, inserting the stopper plate through the tubular jig from its rear end with one of the flanges of the stopper plate located ahead of the other of the flanges until the stopper plate clears the jig, and erecting the stopper plate to allow the flanges of the stopper plate to be received in the groove.

* * * * *